United States Patent [19]

Daly

[11] Patent Number: 4,907,547

[45] Date of Patent: Mar. 13, 1990

[54] ONE-PIECE WAVE DEFLECTOR FOR I.C. ENGINE INTAKE SYSTEM

[75] Inventor: Paul D. Daly, Troy, Mich.

[73] Assignee: Siemens-Bendix Automotive Electronics L.P., Troy, Mich.

[21] Appl. No.: 313,645

[22] Filed: Feb. 21, 1989

[51] Int. Cl.⁴ ............................................. F02M 35/10
[52] U.S. Cl. ................................... 123/52 M; 137/15; 137/595; 251/368
[58] Field of Search ........................ 123/52 M, 52 MV; 137/862, 15, 595, 601; 251/368

[56] References Cited

U.S. PATENT DOCUMENTS

| | | | |
|---|---|---|---|
| 4,783,052 | 11/1988 | Walden | 251/368 |
| 4,794,886 | 1/1989 | Iwamura et al. | 123/52 M |
| 4,795,420 | 1/1989 | Sakurai et al. | 137/595 |
| 4,803,961 | 2/1989 | Hiraoka et al. | 123/52 MV |

*Primary Examiner*—David A. Okonsky
*Attorney, Agent, or Firm*—George L. Boller; Russel C. Wells

[57] ABSTRACT

An internal combustion engine has two differently tuned sets of runners leading to the cylinders. A wave deflector element transversely spans a particular runner for one cylinder and the corresponding particular runner for an adjacent cylinder, and there is one wave deflector element for each pair of cylinders. The wave deflector elements are selectively operated in unison by an actuator to either open or close the runners of the set with which they are associated depending upon the operating state of the engine. The actuator is controlled by an electronic control unit. Each wave deflector element comprises a shaft and a pair of wave deflectors integrally formed of plastic so as to be of one-piece construction. The wave deflector element is resiliently flexible by bending for installation in the runners that it controls.

29 Claims, 4 Drawing Sheets

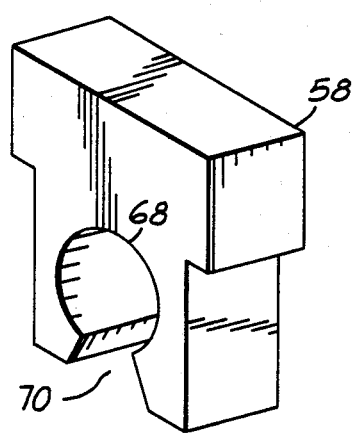
FIG. 5
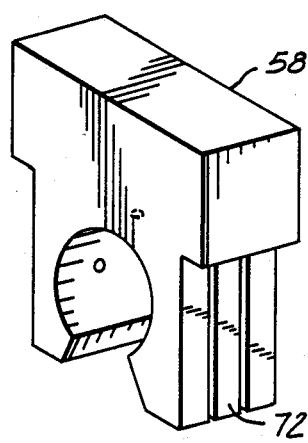
FIG. 6
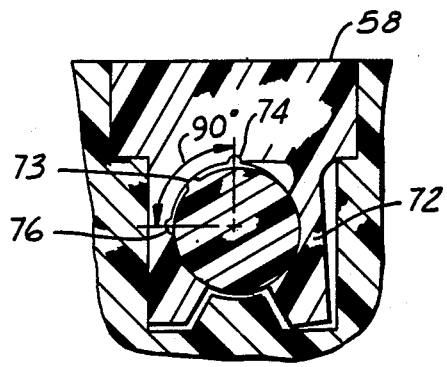
FIG. 7
FIG. 8
FIG. 9
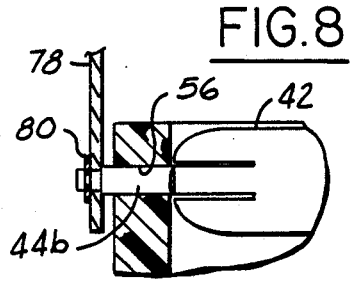
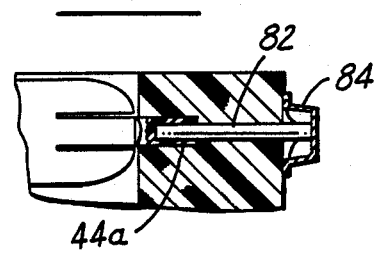

ONE-PIECE WAVE DEFLECTOR FOR I.C. ENGINE INTAKE SYSTEM

BACKGROUND AND SUMMARY OF THE INVENTION

This invention relates generally to internal combustion (I.C.) engine intake systems, and in particular it relates to a novel wave deflector for use in tuned runners to the individual cylinders.

A known construction for an I.C. engine intake system comprises the use of tuned runners leading to the individual cylinders and wave deflectors disposed in association with the runners. In general it may be said that the wave deflectors are selectively operable to de-select a particular set of runners under certain operating conditions so that air is conducted to the cylinders through a differently tuned set of runners. If independently operable wave deflectors are provided in association with each set of runners, each such set can be independently de-selected. A wave deflector is poised at the cylinder end of a runner. It is operable to open and closed positions, opening and closing the associated runner. De-selection of a runner occurs when the corresponding wave deflector is closed. A closed wave deflector blocks, or deflects, the pressure wave that emanates from the corresponding cylinder when the piston within the cylinder is executing the intake stroke.

The known construction for a wave deflector comprises a metal shaft that passes through aligned circular holes in walls separating the runners which extend to adjacent cylinders. Metal blades that form the deflectors are fastened to the shaft. This construction is expensive because it uses a number of individual parts and requires a significant amount of assembly. Moreover, if one of the parts should break away, it could enter the engine cylinder and create undesired consequences.

The present invention arises in part through the recognition that a precise fit of a wave deflector to an associated runner is not essential for the purpose of accomplishing the wave deflection function. In other words, when a wave deflector is closed, it is not essential that the edge of the wave deflector be perfectly sealed with respect to the wall of its runner. Accordingly, the invention contemplates a wave deflector fabricated from a plastic material, and furthermore, a pair of wave deflectors that are integral with the shaft so that as a result, the wave deflectors and shaft constitute a single part or element.

A further attribute of the invention is that suitable plastic materials can make this one-piece wave deflector element resiliently bendable so that it can be installed more expediently than the prior multiple metal piece construction referred to previously. The disclosed plastic wave deflector element also has slots between the wave deflectors and the shaft that facilitate bending during the installation process.

The disclosed wave deflector element spans the runners to two adjacent cylinders. The ends of the element are part of the shaft, and they are fitted to circular holes in respective walls of the runners. The runners share a common wall, and an intermediate portion of the element's shaft must pass through this common wall. In order to acceptably, and conveniently, accommodate this intermediate portion of the shaft, the common wall comprises a slot. A clip that journals the intermediate portion of the shaft is fitted to this slot. The shaft, the clip, and the slot are constructed and arranged such that the wave deflector element is accurately axially located and there is substantial closure of the slot between the two adjacent runners so that there is no cross flow between these runners.

Other related features of the invention are: the formation of an integral sealing lip on the element to seal its journaling in the runner walls; an integral provision for creating an eccentric by which the element can be actuated; a detent mechanism for favoring the open and closed positions as two discrete positions of rotation of the element; and the method of installing the element.

The foregoing, along with additional features, advantages and benefits of the invention will be seen in the ensuing description and claims which should be considered in conjunction with the accompanying drawings. The drawings disclose a presently preferred embodiment of the invention according to the best mode contemplated at this time in carrying out the invention.

BRIEF DESCRIPTION OF THE DRAWINGS

FIG. 5 is a perspective view of one of the component parts of FIG. 3 shown by itself.

FIG. 6 is a view similar to FIG. 5 but illustrating an alternate form.

FIG. 7 is a view taken in the same direction as FIG. 4 but illustrating the part of FIG. 6 in operative association with a wave deflector element in the installed position.

FIG. 8 is a fragmentary view illustrating one end mounting of the wave deflector element.

FIG. 9 is a fragmentary sectional view illustrating another end mounting of the wave deflector element.

DESCRIPTION OF THE PREFERRED EMBODIMENT

Figure 1:
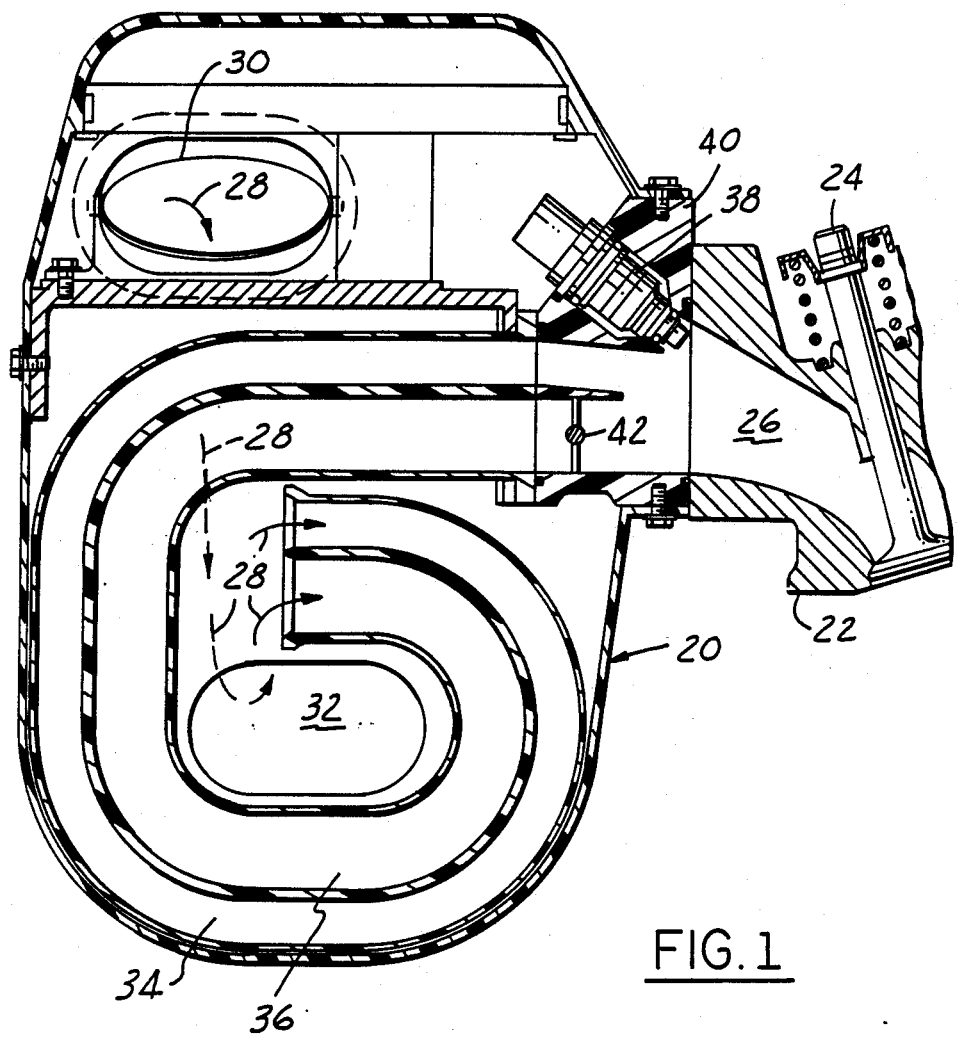
FIG. 1 is a transverse cross-sectional view through an internal combustion engine intake system including the novel wave deflector element of the present invention.

FIG. 1 is a cross-section through a representative intake system 20 of an internal combustion engine. The engine is also representative and by way of example is a four-cylinder gasoline fueled engine. Only the engine cylinder head 22 and an associated intake valve mechanism 24 for one cylinder of the engine are shown in FIG. 1. It can therefore be appreciated that the cross-sectional view of FIG. 1 is through the intake port 26 that leads into the engine cylinder, the intake port being opened to the cylinder whenever the intake valve 24 is opened.

The airflow path through intake system 20 is represented by the arrows 28. Induction air that enters intake system 20 first passes through a main throttle valve 30 which is under the control of an operator to set the degree of throttle blade opening. From there the airflow passes to a plenum region 32 which extends lengthwise of the intake system 20, the length of system 20 being perpendicular to the plane of FIG. 1. For each engine cylinder there are two runners 34 and 36 respectively. Hence FIG. 1 shows the two runners 34, 36 that lead to one cylinder. The runners extend to the intake port 26, communicating the plenum 32 to the intake port. An electromagnetic fuel injector 38 is located in a fuel rail block 40. The injector is operated in suitably timed relation to spray fuel into intake port 26 for mixture with the air that has passed through the intake system to thereby form a combustible mixture that is introduced into the engine cylinder when valve 24 is open. A wave deflector element 42 is disposed in association with runner 36 just upstream of the intake valve mechanism 24.

FIG. 1 shows the wave deflector element 42 in closed position. In this condition induction air to the cylinder passes through runner 34 and not through runner 36. The wave deflector serves to block, or deflect, the pressure wave that emanates from the cylinder when the piston within the cylinder is executing the intake stroke.

Figure 2:
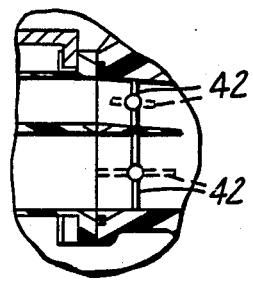
FIG. 2 is fragmentary view showing an alternate embodiment.

FIG. 2 shows two wave deflector elements 42, one in association with runner 34, the other with runner 36.

Figure 3:
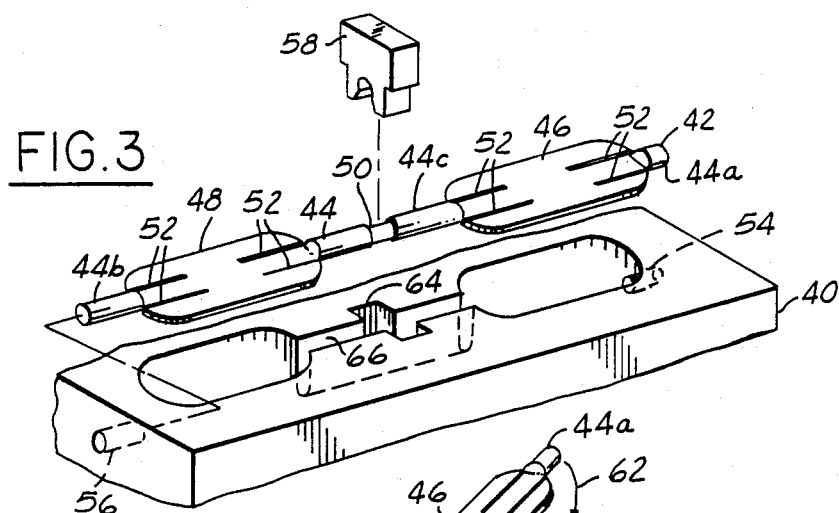
FIG. 3 is a fragmentary exploded perspective view illustrating a wave deflector element and related parts.
Figure 3A:
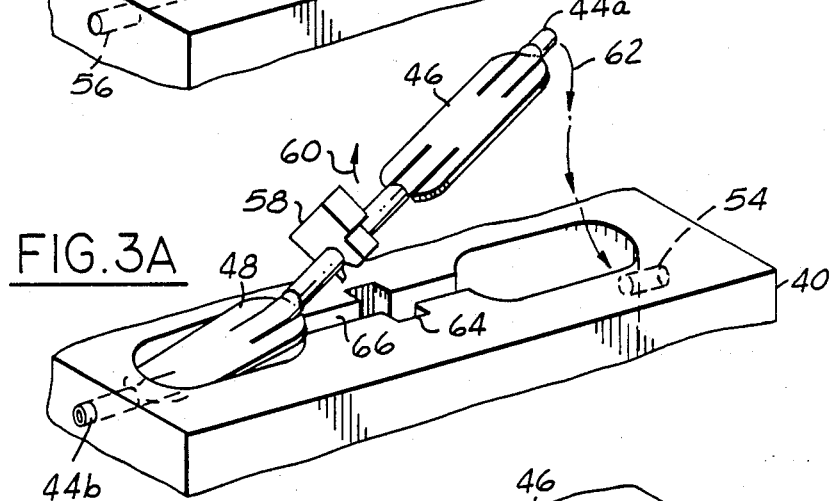
FIG. 3A is a view similar to FIG. 3 illustrating the manner of assembly of the parts of FIG. 3.
Figure 3B:
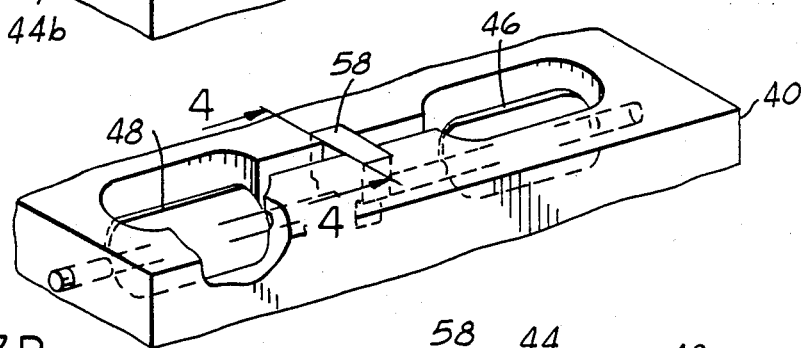
FIG. 3B is a view similar to FIGS. 3 and 3A illustrating the final assembled position.

FIGS. 3, 3A, AND 3B portray a representative wave deflector element 42 that embodies principles of the invention. The wave deflector element is a one-piece plastic part and comprises a shaft 44 and a pair of wave deflectors 46, 48. The shaft and wave deflectors are integrally formed from plastic so as to constitute a single part. The wave deflectors 46, 48 are flat. The shaft comprises circular end portions 44a and 44b and a circular intermediate portion 44c. A recessed shoulder 50 is provided at the middle of portion 44c.

The shaft may be considered flat as it passes across each wave deflector. Four slits 52 are provided in each wave deflector alongside where the flattened shaft passes across. Slits 52 are parallel to the shaft each beginning at an edge of each wave deflector and extending partially across the wave deflector. There are two slits in alignment with each other on one side of the shaft and two more in alignment with each other on the opposite side of the shaft. The purpose of the slits 52 is to facilitate flexing of the wave deflector element shaft when the wave deflector element is assembled to fuel rail block 40 in the manner that will now be described with reference to FIGS. 3A and 3B.

The wave deflector material comprises any suitable plastic which is resiliently bendable. Assembly of the wave deflector element to the fuel rail block is accomplished in the following manner. First, the fuel rail block 40 is provided with suitable formations constituting the terminations of the respective runners with which the two wave deflectors 46 and 48 are disposed. The wave deflector 48 is associated with the runner 36 leading to one engine intake port 26 while the other wave deflector 46 is associated with the intake port 26 and the runner 36 of the immediately adjacent cylinder.

A pair of aligned circular holes 54 and 56 are provided in walls of fuel rail block 40. Before the wave deflector element is assembled into the fuel rail block a plastic clip 58 is assembled onto shoulder 50. Assembly of the wave deflector element to the fuel rail block is accomplished by inserting the shaft end 44b into hole 56 in the manner shown in FIG. 3A. At this time the wave deflector element is flexed in the manner shown. Thereafter the shaft is flexed into more of an S shape as represented by the arrows 60 and 62 respectively, and the shaft end 44a is brought into alignment with and inserted into hole 54. At the same time that this is happening, clip 58 is being disposed in a T-shaped slot 64 that is transverse to a U-shaped slot 66 within which the central portion 44c of the shaft 44 is disposed. The final assembled position is portrayed in FIG. 3B.

Figure 4:
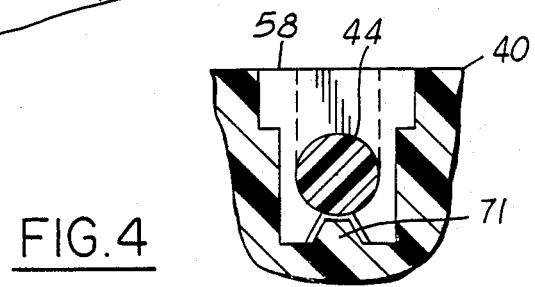
FIG. 4 is a transverse cross-sectional view on an enlarged scale in the direction of arrows 4—4 in FIG. 3B.
Figure 10:
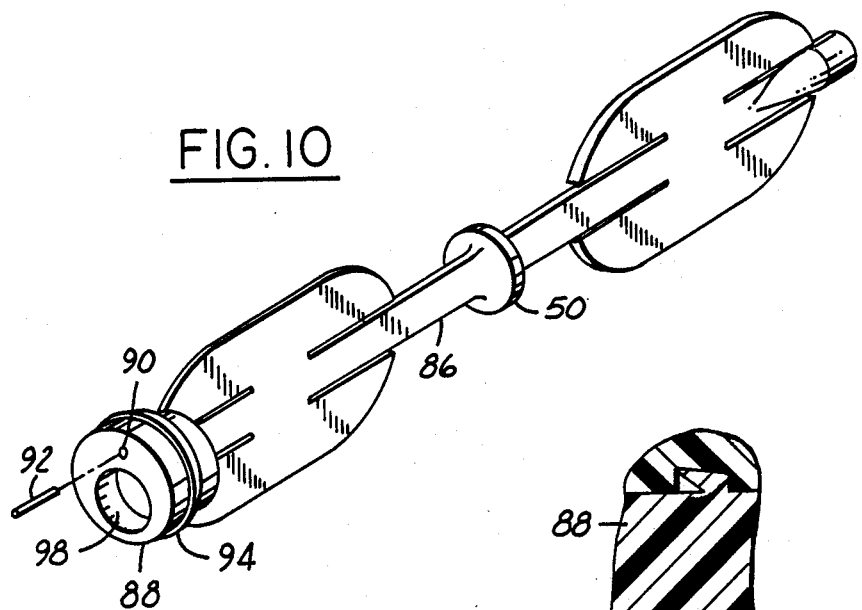
FIG. 10 is an exploded prospective view illustrating an alternate embodiment of wave deflector element.
Figure 11:
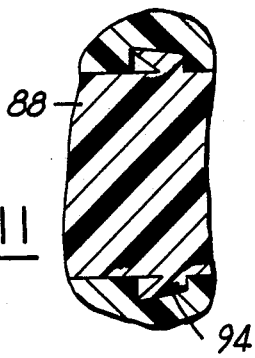
FIG. 11 is a transverse cross-sectional view on an enlarged scale through the near end portion of FIG. 10.
Figure 12:
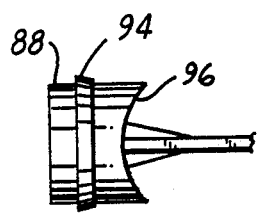
FIG. 12 is a fragmentary view of an alternate configuration for an end of a wave deflector.
Figure 13:
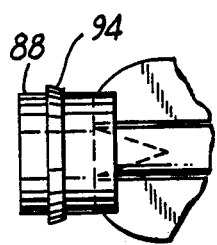
FIG. 13 is a view similar to FIG. 12 but with the wave deflector rotated ninety degrees about its own axis.

The shape of clip 58 is perhaps best seen in FIG. 5. The clip has a general T-shape and comprises a circular hole 68 for fitting onto shaft 44. The diameter of hole 68 is one that will fit closely for embracing shoulder 50. The hole 68 is only a partial one, however, since a throat 70 is provided in the bottom of the clip intercepting hole 68. The throat coupled with the resilient flexibility of the material of the clip enables the clip to be snapped onto the shaft. This can be seen best in FIG. 4. In FIG. 4 it also shows that the clip and the shaft substantially fill the slot 64 so as to block any leak path between the two runners with which the respective wave deflectors 46 and 48 are associated. It can be seen in FIG. 4 that there is a land 71 which fills the throat 70 of the clip. It will be observed that with the clip disposed in slot 64 the clip cannot be flexed open and thereby serves to embrace shaft 44. Moreover, the clip serves to axially locate the wave deflector element between holes 54 and 56. It will also be observed that the shaft end 44b is somewhat longer than the shaft end 44a to facilitate the assembly process.

Because the assembly process involves a certain limited amount of axial play, the wave deflectors do not have a perfect fit within their respective runners. This, however, is not critical because it has been found that substantial closure of a runner is effective to perform the wave deflection function. The ends 44a, 44b of the shaft have a sufficiently close fit with holes 54, 56 so that leakage through these points is not a problem.

The wave deflector element is operated by an actuator (not shown) and the actuator in turn is controlled by an electronic control unit (ECU). The wave deflectors are operated between open and closed positions that are approximately ninety degrees apart. In the closed position, the wave deflectors are perpendicular to the flow through the runners and in the open position they are parallel to the flow. The embodiment of clip and shaft shown in FIGS. 5, 6 and 7 comprises a detent mechanism for defining these two open and closed positions. The clip is provided with a spring leaf 72 that bears against the side of the shaft. The shaft is provided with a bump 73, and the inside of hole 68 is provided with two indentations 74 and 76 that are ninety degrees apart. The spring leaf 72 urges the bump 73 against the wall of hole 68 that lies between indentations 74 and 76. When the wave deflectors are blocking flow, the bump fits into one of the indentations 74, 76 and when the wave deflectors are fully open it fits into the other indentation. In this way, the detent mechanism tends to favor the positioning of the wave deflectors in either the open or closed position as distinguished from any intermediate position; however, they do not unduly restrict the ability of the actuator to move the wave deflectors between the open and closed positions.

FIG. 8 shows an arrangement for operating the wave deflector element. The operating arrangement involves making the end 44b sufficiently long that it protrudes through the hole 56 and attaching a lever 78 to the protruding end. The lever has a non-circular hole fitting onto a reduced diameter portion at the end of the shaft and is retained between a shoulder formed in the shaft end and a snap retaining ring 80 that is fitted onto the reduced diameter shaft end.

In FIG. 9 a connection may be made to the opposite end 44a of the shaft by providing that opposite end with a hole and passing a pin 82 through the hole in the fuel rail wall into the hole in the end of the shaft. The pin 82 has a sufficient length that it protrudes through the hole in the wall, and a cap 84 is fitted over the end of the pin 82.

FIGS. 10-13 show a further embodiment 86 of a wave deflector element. This element comprises an integral actuator at the near end as viewed in FIG. 10. The actuator is in the form of a cylinder 88 that is coaxial with the element's axis. The circular enlargement contains a small hole 90 that is offset from the element's axis. The holes into which the element is mounted are suitably shaped to receive the smaller far end of the shaft as viewed in FIG. 10 and cylinder 88. After assembly of the element into the fuel rail, a pin 92 is pressed into hole 90 and this pin can be connected to the actuator for actuating the wave deflector element. As such, the pin and hole are eccentric and form a lever. A further feature is that a circular lip seal 94 is provided around the outside of cylinder 88. The lip seal makes contact with the inside wall of the hole within which cylinder 88 is mounted.

A still further feature is that the face of cylinder 88 that is toward the adjacent wave deflector contains a profile 96 corresponding to an immediately contiguous portion of the transverse cross-section of the runner within which that wave deflector is disposed such that when the wave deflector is opening the runner, the cylinder presents no discontinuity to flow through the runner. This condition is most readily seen in FIG. 12. The cylinder 88 contains a hole 98 in the end to save on material used in making the wave deflector.

A further difference in element 86 is that the shoulder 50 in the center of the shaft is raised, rather than being depressed. It will be understood that certain changes are made in clip 58 to accommodate the raised shoulder.

Insofar as the material of the wave deflector elements is concerned, any plastic that is resiliently bendable and can withstand the moderately elevated temperatures to which the wave deflectors will be exposed (200 degrees F. is typical) is suitable. There are many plastics that meet these criteria.

While a preferred embodiment of the invention has been described, it will be appreciated that principles are applicable to other embodiments.

What is claimed is:

1. In an internal combustion engine comprising a pair of cylinders within which combustion takes place, an intake valve for each cylinder, a pair of runners for each cylinder through which air is conducted to the intake valve of the cylinder, a main air throttle mechanism disposed upstream of the runners for throttling the induction airflow into the cylinders, and a wave deflector mechanism disposed in a particular runner for one cylinder of said pair of cylinders and in a particular runner for the other cylinder of said pair of cylinders, said wave deflector mechanism being disposed just upstream of the intake valves of the two cylinders, said wave deflector mechanism comprising a rotary shaft that transversely spans both the particular runner for said one cylinder and the particular runner for the other cylinder and wave deflectors on and rotatable with said shaft for selectively opening and closing the particular runner for said one cylinder and the particular runner for said other cylinder, the improvement characterized in that said wave deflectors and said shaft are integrally formed as a single part.

2. The improvement set forth in claim 1 wherein the wave deflectors are spaced apart from each other along the length of the shaft, there is a wall separating said particular runner for said one cylinder from said particular runner for said other cylinder, said shaft passes through a slot in said wall, and including a clip disposed in said slot at least partially embracing said shaft.

3. The improvement set forth in claim 2 wherein said clip and said slot are constructed and arranged to provide substantial closure of said slot between said particular runner for said one cylinder and said particular runner for said other cylinder.

4. The improvement set forth in claim 3 wherein said clip has a throat that can be spread open to allow the clip to be pushed onto the shaft in a direction radially of the shaft prior to assembly of the clip and wave deflector mechanism to the runners, said slot having a shape complementary to the clip so that once the wave deflector mechanism has been installed with the clip disposed in said slot, the clip cannot be spread open thereby constraining the clip on the shaft.

5. The improvement set forth in claim 4 wherein said clip has a general T-shape as viewed axially of said shaft.

6. The improvement set forth in claim 2 wherein said clip and shaft have a detent mechanism that favors two discrete rotational positions of the shaft, said positions causing said deflectors to be full open and full closed respectively.

7. The improvement set forth in claim 2 including a shoulder formed in said shaft for axially locating the shaft with respect to the clip, said slot being shaped to axially locate said clip.

8. The improvement set forth in claim 1 wherein said shaft is resiliently flexible by bending.

9. The improvement set forth in claim 8 including slits that separate portions of the wave deflectors from the shaft to aid in bending of the shaft.

10. The improvement set forth in claim 9 wherein said slits are parallel to the shaft, each beginning at an edge of each deflector and extending partially across each deflector.

11. The improvement set forth in claim 10 wherein there are four slits per deflector, two in alignment with each other on one side of the shaft, and two more in alignment with each other on the opposite side of the shaft.

12. The improvement set forth in claim 1 in which opposite ends of said shaft are journaled in respective walls, one of said ends comprising an integral eccentric via which the shaft is rotated.

13. The improvement set forth in claim 12 in which said one end of said shaft comprises a circular enlargement coaxial with said shaft, said eccentric being provided in said enlargement.

14. The improvement set forth in claim 13 including an integral circular sealing lip extending around said circular enlargement and providing a seal of the enlargement with respect to the wall that journals said one shaft end.

15. The improvement set forth in claim 1 in which opposite ends of the shaft are journaled in respective walls, one of said shaft ends comprising an integral circular sealing lip extending around said one shaft end providing a seal thereof to the wall that journals said one shaft end.

16. The improvement set forth in claim 1 wherein one end of said shaft fits into a blind hole, the other end of said shaft fits into a through-hole, and said one shaft end is shorter than said other shaft end.

17. The improvement set forth in claim 1 including a further wave deflector mechanism disposed in the other runner for said one cylinder and the other runner for said other cylinder, said further wave deflector mechanism being disposed just upstream of the intake valves of the two cylinders, said further wave deflector mechanism comprising a rotary shaft that transversely spans both the other runner for said one cylinder and the other runner for said other cylinder and wave deflectors on and rotatable with the shaft of said further wave deflector mechanism for selectively opening and closing the other runner for said one cylinder and the other runner for said other cylinder, said further wave deflector mechanism having its shaft and its wave deflectors integrally formed as a single part.

18. The improvement set forth in claim 1 in which opposite ends of said shaft are journaled in respective walls, one of said shaft ends containing a cylindrical shape the end face of which that is toward the nearer of said runners containing a profile corresponding to an immediately contiguous portion of the transverse cross section of such nearer runner such that when the wave deflector that controls such nearer runner is opening such nearer runner, said one of said ends presents no discontinuity to flow through such nearer runner.

19. A wave deflector element for use in an internal combustion engine just upstream of the engine's intake valve mechanism for selectively opening and closing runners through which throttled air is inducted into the engine's combustion chamber space, said wave deflector element comprising a shaft and at least two wave deflectors on said shaft, said wave deflectors and said shaft being integrally formed as a single plastic part.

20. A wave deflector element as set forth in claim 19 in which said shaft is resiliently flexible by bending including slots that separate portions of the wave deflectors from the shaft to aid in bending of the shaft.

21. A wave deflector element as set forth in claim 20 in which said slots are parallel to the shaft, each beginning at an edge of each deflector and extending partially across each deflector, there being four slots per deflector, two in alignment with each other on one side of the shaft, and two more in alignment with each other on the opposite side of the shaft.

22. In an internal combustion engine comprising a pair of cylinders within which combustion takes place, an intake valve for each cylinder, a pair of runners for each cylinder through which air is conducted to the intake valve of the cylinder, a main air throttle mechanism disposed upstream of the runners for throttling the induction airflow into the cylinders, and a wave deflector mechanism disposed in a particular runner for one cylinder of said pair of cylinders and in a particular runner for the other cylinder of said pair of cylinders, said wave deflector mechanism being disposed just upstream of the intake valves of the two cylinders, said wave deflector mechanism comprising a rotary shaft that transversely spans both the particular runner for said one cylinder and the particular runner for the other cylinder and wave deflectors on and rotatable with said shaft for selectively opening and closing the particular runner for said one cylinder and the particular runner for said other cylinder, the method of assembling the wave deflector mechanism to the runners which comprises making said shaft to be nominally straight but resiliently bendable, providing a pair of aligned holes in opposite wall portions of said runners, the distance between said holes being less than the length of said shaft, fitting one end of said shaft into one of said holes while the shaft is resiliently bent, fitting the opposite end of said shaft into the other of said holes while the shaft is resiliently bent, and then allowing the shaft to return to its nominally straight condition.

23. In an internal combustion engine comprising a cylinder within which combustion takes place, an intake valve for said cylinder, a pair of runners for said cylinder through which air is conducted to said cylinder, a main air throttle mechanism disposed upstream of the runners for throttling the induction airflow into the cylinder, and a wave deflector mechanism disposed in a particular runner for said cylinder, said wave deflector mechanism being disposed just upstream of the intake valve, said wave deflector mechanism comprising a rotary shaft that spans said particular runner, and a wave deflector on and rotatable with said shaft for selectively opening and closing said particular runner, the improvement characterized in that said wave deflector and said shaft are integrally formed as a single part.

24. The improvement set forth in claim 23 wherein said shaft is resiliently flexible by bending.

25. The improvement set forth in claim 24 including slits that separate portions of said wave deflector from said shaft to aid in bending of said shaft.

26. The improvement set forth in claim 25 wherein said slits are parallel to said shaft, each beginning at an edge of the wave deflector and extending partially across the wave deflector.

27. The improvement set forth in claim 26 wherein there are four slits in the wave deflector, two in alignment with each other on one side of the shaft, and two more in alignment with each other on the opposite side of the shaft.

28. The improvement set forth in claim 23 wherein one end of said shaft comprises an integral eccentric via which the shaft is rotated.

29. The improvement set forth in claim 23 in which one end of said shaft comprises an integral circular sealing lip.

* * * * *